(12) United States Patent
Kim et al.

(10) Patent No.: US 11,310,895 B2
(45) Date of Patent: Apr. 19, 2022

(54) LIGHTING SYSTEM AND LIGHTING DEVICE

(71) Applicant: SAMSUNG ELECTRONICS CO., LTD., Suwon-si (KR)

(72) Inventors: Chang Seob Kim, Suwon-si (KR); Taek Hyu Lee, Suwon-si (KR); Ho Chan Cho, Suwon-si (KR); Sang Jin Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 16/659,951

(22) Filed: Oct. 22, 2019

(65) Prior Publication Data

US 2020/0323054 A1  Oct. 8, 2020

(30) Foreign Application Priority Data

Apr. 5, 2019 (KR) .......... 10-2019-0040389

(51) Int. Cl.
*H05B 47/19* (2020.01)
*H05B 47/155* (2020.01)
(Continued)

(52) U.S. Cl.
CPC ............ *H05B 47/19* (2020.01); *H04W 84/02* (2013.01); *H04W 88/16* (2013.01);
(Continued)

(58) Field of Classification Search
CPC ...... H05B 47/19; H05B 47/155; H05B 47/22; H05B 47/235; H05B 45/10; H04W 80/00;
(Continued)

(56) References Cited

U.S. PATENT DOCUMENTS 6,372,608 B1  4/2002  Shimoda et al.
6,645,830 B2  11/2003  Shimoda et al.
(Continued)

FOREIGN PATENT DOCUMENTS

KR  1020140122909  10/2014
KR  10-1678835  11/2016
(Continued)

*Primary Examiner* — Abdullah A Riyami
*Assistant Examiner* — Syed M Kaiser
(74) *Attorney, Agent, or Firm* — F. Chau & Associates, LLC

(57) ABSTRACT

A lighting system includes a plurality of lighting devices installed in a predetermined space and connected to one another to communicate with one another using at least one of a first communication method and a second communication method, and a mobile device directly connected to at least one of the plurality of lighting devices to communicate therewith according to the first communication method. The first communication method and the second communication method are different. Each of the plurality of lighting devices includes a communication module configured to support the first communication method and the second communication method, and a driver configured to drive a light source in response to a control command received by the communication module.

19 Claims, 17 Drawing Sheets

(51) Int. Cl.
*H04W 84/02* (2009.01)
*H01Q 1/24* (2006.01)
*H04W 88/16* (2009.01)
*H01Q 5/00* (2015.01)

(52) U.S. Cl.
CPC .......... *H05B 47/155* (2020.01); *H01Q 1/243* (2013.01); *H01Q 5/00* (2013.01)

(58) Field of Classification Search
CPC ........ H04W 84/02; H04W 88/16; H01Q 5/00; H01Q 1/243; H01Q 23/00
See application file for complete search history.

(56) References Cited

U.S. PATENT DOCUMENTS

| | | | |
|---|---|---|---|
| RE38,466 E | 3/2004 | Inoue et al. | |
| 6,818,465 B2 | 11/2004 | Biwa et al. | |
| 6,818,530 B2 | 11/2004 | Shimoda et al. | |
| 6,858,081 B2 | 2/2005 | Biwa et al. | |
| 6,967,353 B2 | 11/2005 | Suzuki et al. | |
| 7,002,182 B2 | 2/2006 | Okuyama et al. | |
| 7,084,420 B2 | 8/2006 | Kim et al. | |
| 7,087,932 B2 | 8/2006 | Okuyama et al. | |
| 7,154,124 B2 | 12/2006 | Han et al. | |
| 7,208,725 B2 | 4/2007 | Sherrer et al. | |
| 7,288,758 B2 | 10/2007 | Sherrer et al. | |
| 7,319,044 B2 | 1/2008 | Han et al. | |
| 7,501,656 B2 | 3/2009 | Han et al. | |
| 7,709,857 B2 | 5/2010 | Kim et al. | |
| 7,759,140 B2 | 7/2010 | Lee et al. | |
| 7,781,727 B2 | 8/2010 | Sherrer et al. | |
| 7,790,482 B2 | 9/2010 | Han et al. | |
| 7,940,350 B2 | 5/2011 | Jeong | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,399,944 B2 | 3/2013 | Kwak et al. | |
| 8,432,511 B2 | 4/2013 | Jeong | |
| 8,459,832 B2 | 6/2013 | Kim | |
| 8,502,242 B2 | 8/2013 | Kim | |
| 8,536,604 B2 | 9/2013 | Kwak et al. | |
| 8,735,931 B2 | 5/2014 | Han et al. | |
| 8,766,295 B2 | 7/2014 | Kim | |
| 9,320,121 B2 | 4/2016 | Sun et al. | |
| 9,468,078 B1 * | 10/2016 | White | H04W 48/16 |
| 9,485,843 B2 | 11/2016 | Oh et al. | |
| 9,526,153 B2 | 12/2016 | Noori et al. | |
| 9,548,535 B1 * | 1/2017 | Kuo | H01Q 1/243 |
| 9,559,407 B2 * | 1/2017 | Van Dijk | H01Q 1/02 |
| 9,807,857 B2 | 10/2017 | Huang | |
| 10,020,833 B2 * | 7/2018 | Nourbakhsh | F21V 23/045 |
| 10,080,274 B2 * | 9/2018 | Johnson | F21V 15/015 |
| 10,514,156 B2 * | 12/2019 | Ando | F21V 15/01 |
| 2009/0003832 A1 * | 1/2009 | Pederson | H05B 47/19 398/135 |
| 2009/0278479 A1 * | 11/2009 | Platner | H05B 47/175 315/312 |
| 2010/0084992 A1 * | 4/2010 | Valois | H05B 47/18 315/291 |
| 2011/0069962 A1 * | 3/2011 | Castor | H05B 47/19 398/115 |
| 2011/0098916 A1 * | 4/2011 | Jang | G01C 21/3697 701/533 |
| 2011/0112661 A1 | 5/2011 | Jung et al. | |
| 2011/0221348 A1 | 9/2011 | Kwag et al. | |
| 2011/0242804 A1 | 10/2011 | Yang et al. | |
| 2011/0309915 A1 | 12/2011 | Cho et al. | |
| 2012/0007525 A1 | 1/2012 | Cho et al. | |
| 2012/0013434 A1 | 1/2012 | Park et al. | |
| 2012/0323474 A1 * | 12/2012 | Breed | G01S 19/42 701/117 |
| 2013/0258967 A1 * | 10/2013 | Watfa | H04W 76/10 370/329 |
| 2013/0320861 A1 * | 12/2013 | Sinai | H05B 45/00 315/152 |
| 2014/0125250 A1 * | 5/2014 | Wilbur | H01Q 1/2291 315/297 |
| 2014/0146801 A1 * | 5/2014 | Laha | H04W 4/18 370/338 |
| 2014/0222213 A1 * | 8/2014 | Mohan | H05B 47/175 700/275 |
| 2015/0055640 A1 * | 2/2015 | Wang | H04W 60/00 370/338 |
| 2015/0130365 A1 | 5/2015 | Kim et al. | |
| 2015/0237707 A1 | 8/2015 | Cho et al. | |
| 2015/0245234 A1 * | 8/2015 | Roy | H04W 52/243 370/252 |
| 2016/0007138 A1 * | 1/2016 | Palanisamy | H04W 4/70 455/41.2 |
| 2016/0127875 A1 * | 5/2016 | Zampini, II | H04W 52/0296 370/311 |
| 2016/0156765 A1 * | 6/2016 | Garcia Marcho | H04W 76/14 455/420 |
| 2016/0258617 A1 * | 9/2016 | Wang | H04R 1/028 |
| 2016/0286629 A1 * | 9/2016 | Chen | H05B 45/10 |
| 2017/0171941 A1 * | 6/2017 | Steiner | H04N 7/188 |
| 2017/0238401 A1 * | 8/2017 | Sadwick | F21K 9/235 315/294 |
| 2017/0310743 A1 * | 10/2017 | Aoyama | H04B 10/116 |
| 2018/0004458 A1 * | 1/2018 | Yanagawa | G06F 3/1217 |
| 2018/0070428 A1 | 3/2018 | Huang | |
| 2018/0077782 A1 * | 3/2018 | Kim et al. | |
| 2018/0129493 A1 * | 5/2018 | Deixler | H04L 12/2816 |
| 2018/0132153 A1 * | 5/2018 | Ku | H04W 24/06 |
| 2018/0146646 A1 * | 5/2018 | Ikeda | A01K 29/00 |
| 2018/0158460 A1 * | 6/2018 | Lee | H05B 47/19 |
| 2018/0278431 A1 * | 9/2018 | Yoon | H04L 12/28 |
| 2019/0014529 A1 * | 1/2019 | Karampatsis | H04W 40/248 |
| 2019/0123930 A1 * | 4/2019 | Kashef | G06F 3/167 |
| 2019/0132815 A1 * | 5/2019 | Zampini, II | H04W 64/003 |
| 2019/0215153 A1 * | 7/2019 | Han | H04L 9/0833 |
| 2019/0364598 A1 * | 11/2019 | Ringland | H04W 92/20 |
| 2020/0120458 A1 * | 4/2020 | Aldana | H04W 28/22 |

FOREIGN PATENT DOCUMENTS

| | | |
|---|---|---|
| KR | 1020170070328 | 6/2017 |
| KR | 10-1823827 | 3/2018 |

* cited by examiner

LIGHTING SYSTEM AND LIGHTING DEVICE

CROSS-REFERENCE TO RELATED APPLICATION

This application claims priority under 35 U.S.C. § 119 to Korean Patent Application No. 10-2019-0040389, filed on Apr. 5, 2019 in the Korean Intellectual Property Office, the disclosure of which is incorporated by reference herein in its entirety.

TECHNICAL FIELD

Exemplary embodiments of the inventive concept relate to a lighting system and a lighting device.

DISCUSSION OF RELATED ART

Research into smart lighting that may be controlled using wireless communications has actively been conducted. Smart lighting may receive a control command through a hub and/or from the cloud through wireless communications, or may be directly connected to a mobile device, without a separate hub or cloud, to receive a control command through wireless communications. In general, smart lighting supports only one wireless communication method, and therefore, it may be difficult to configure a lighting system using smart lighting depending on the presence or absence of a hub or a wireless communication method supported by a mobile device.

SUMMARY

According to an exemplary embodiment of the inventive concept, a lighting system may include a plurality of lighting devices installed in a predetermined space and connected to one another to communicate with one another using at least one of a first communication method and a second communication method, and a mobile device directly connected to at least one of the plurality of lighting devices to communicate therewith according to the first communication method. The first communication method and the second communication method may be different. Each of the plurality of lighting devices may include a communication module configured to support the first communication method and the second communication method, and a driver configured to drive a light source in response to a control command received by the communication module.

According to an exemplary embodiment of the inventive concept, a lighting device may include a communication module having at least one communication chip supporting a first communication method and a second communication method, and one antenna connected to the at least one communication chip, a light source having a plurality of light emitting diodes (LEDs), and a driver configured to drive the light source in response to a control command received by the communication module. The first communication method and the second communication method may be different.

BRIEF DESCRIPTION OF DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1A:
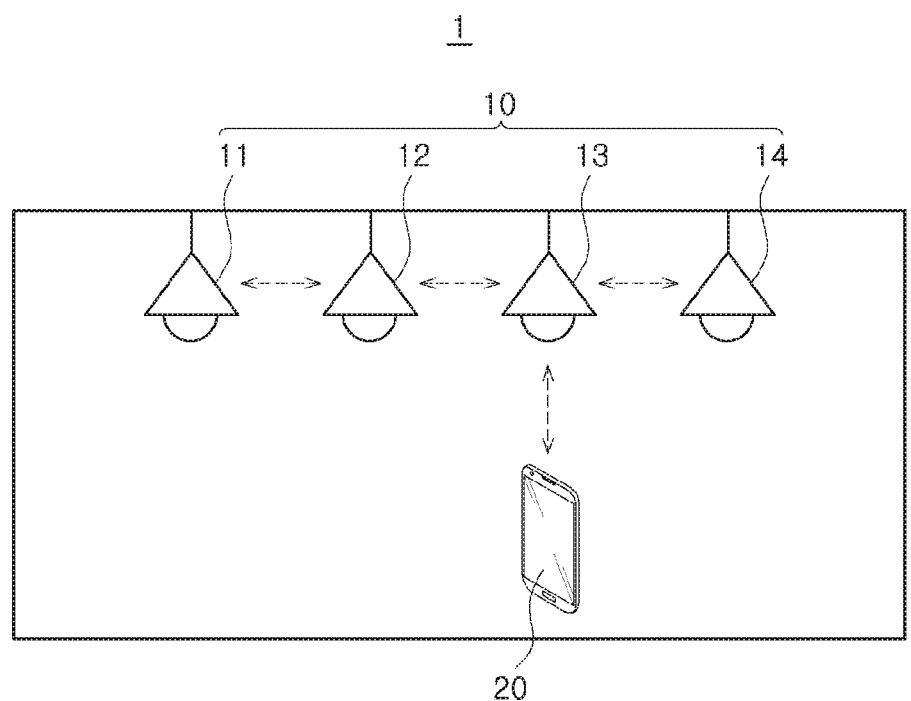
FIG. 1A is a view illustrating a lighting system according to an exemplary embodiment of the inventive concept.

Exemplary embodiments of the inventive concept provide a lighting system and a lighting device which may be realized in various forms depending on a communication method supported by a mobile device and the presence or absence of a hub, by installing a communication module that supports a plurality of wireless communication methods in smart lighting.

Exemplary embodiments of the inventive concept will now be described in detail with reference to the accompanying drawings. Like reference numerals may refer to like elements throughout this application.

FIG. 1A is a view illustrating a lighting system according to an exemplary embodiment of the inventive concept.

Referring to FIG. 1A, a lighting system 1 according to an exemplary embodiment of the inventive concept may include a plurality of lighting devices 10 (11 to 14), a mobile device 20, and the like. Each of the plurality of lighting devices 10 includes a communication module, and the communication module may support a first communication method and a second communication method which are different from each other. Both the first communication method and the second communication method may be wireless communication methods. The plurality of lighting devices 10 may communicate directly with the mobile device 20 by at least one of the first communication method and the second communication method. In addition, the plurality of lighting devices 10 may be connected to communicate with one another by at least one of the first communication method and the second communication method.

The mobile device 20 may be a device supporting wireless communication such as a smartphone, a tablet PC, or the like. At least one of the first communication method and the second communication method supported by the plurality of lighting devices 10 may be a communication method unilaterally supported by the mobile device 20. For example, the first communication method may be Bluetooth or Bluetooth Low Energy (BLE). In general, most mobile devices include a Bluetooth communication module, and thus the plurality of lighting devices 10 may be connected to be able to communicate directly with the mobile device 20 by the first communication method.

Meanwhile, the second communication method, which is a wireless communication method different from the first communication method, may be a wireless communication method for connecting a gateway that provides a function of a hub for the plurality of lighting devices 10. For example, the second communication method may be Zigbee®, Z-Wave, Wi-Fi, or the like. The plurality of lighting devices 10 may be connected to the gateway by the second communication method and may communicate with one another through the gateway without intervention of the mobile device 20. Additionally, the plurality of lighting devices 10 may be connected to the gateway by the second communication method and may be connected to be able to directly communicate with one another by the first communication method.

In an exemplary embodiment of the inventive concept, the plurality of lighting devices 10 may be connected to be able to communicate directly with the mobile device 20 by at least one of the first communication method and the second communication method. In addition, the plurality of lighting devices 10 may communicate with one another by at least one of the first communication method and the second communication method. Therefore, the lighting system 1 including the plurality of lighting devices 10 may be realized in various ways in consideration of the presence or absence of the gateway and the communication methods supported by the mobile device 20, and user convenience and system expandability may be improved.

Figure 1B:
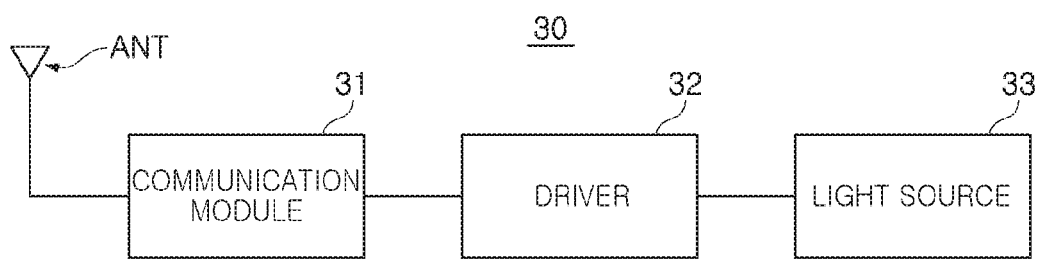
FIG. 1B is a block diagram illustrating a lighting device according to an exemplary embodiment of the inventive concept.

FIG. 1B is a block diagram illustrating a lighting device according to an exemplary embodiment of the inventive concept.

Referring to FIG. 1B, a lighting device 30 according to an exemplary embodiment of the inventive concept may include a communication module 31, a driver 32, and a light source 33. The light source 33 may include at least one LED, and the driver 32 may include a circuit for driving the at least one LED. For example, the driver 32 may drive the LED included in the light source 33 by a pulse width modulation (PWM) method.

The communication module 31 may support the first communication method and the second communication method. The communication module 31 may include a first communication chip providing the first communication method and a second communication chip providing the second communication method. Alternatively, the communication module 31 may include a controller and a first communication circuit generating and processing a radio frequency (RF) signal based on the first communication method and a second communication circuit generating and processing an RF signal based on the second communication method under the control of the controller. Alternatively, the communication module 31 may include one communication chip, and the one communication chip may process all the RF signals based on the first communication method and the second communication method.

The communication module 31 may transmit or receive a signal through an antenna ANT. In the exemplary embodiment illustrated in FIG. 1B, the communication module 31 includes one antenna ANT but alternatively, a plurality of antennas for providing the first communication method and second communication method may be included in the communication module 31. In an exemplary embodiment in which the communication module 31 includes one antenna ANT, various schemes for one antenna ANT to share the first communication method and second communication method may be applied.

Meanwhile, the communication module 31 and the driver 32 may be controlled by a single controller. For example, the controller may be integrated with the communication module 31 or the driver 32 into one module, or may be disposed outside the communication module 31 and the driver 32. The controller may control an operation of the communication module 31 to receive a control command from another external device and transmit information of the lighting device 30 to the other external device and control an operation of the driver 32 to adjust brightness, an illumination time, or the like of the light source 33.

Figure 2:
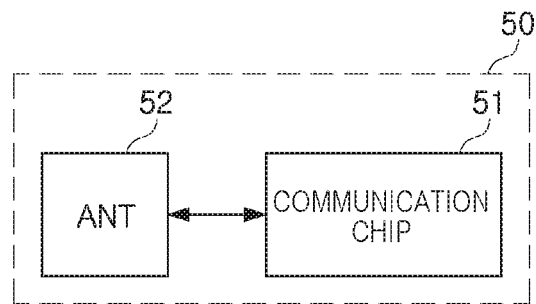
FIG. 2 is a block diagram illustrating a communication module included in a lighting device according to an exemplary embodiment of the inventive concept.

FIG. 2 is a block diagram illustrating a communication module included in a lighting device according to an exemplary embodiment of the inventive concept.

Referring to FIG. 2, a communication module 50 according to an exemplary embodiment of the inventive concept may include a communication chip 51, an antenna ANT 52, and the like. The communication chip 51 may support a plurality of different communication methods such as Zigbee®, Z-Wave, Wi-Fi, ultra-wideband (UWB), infrared (IR) communication, Bluetooth, or BLE.

The communication module 50 may include one antenna 52. However, according to exemplary embodiments of the inventive concept, a plurality of antennas corresponding to different communication methods supported by the communication chip 51 may be included in the communication module 50.

The communication module 50 may communicate directly with an external mobile device or with another external communication module using a plurality of communication methods. For example, the communication module 50 may communicate directly with the external mobile device by the first communication method such as Bluetooth, BLE, or the like, and communicate with an external gateway or another communication module by the second communication method such as Zigbee®, Z-Wave, or the like.

The communication chip 51 may handle processes based on a plurality of communication methods. For example, when data is exchanged by the first communication method, the communication chip 51 may deactivate the second communication method and allocate the antenna 52 only to the first communication method. In the opposite case, the communication chip 51 may deactivate the first communication method, while exchanging data by the second communication method.

Alternatively, the processes according to the first communication method and the second communication method may be substantially simultaneously performed, and the antenna 52 may be assigned to the first communication method and the second communication method in a time-division manner or the like. For example, the communication chip 51 may allocate the antenna 52 to the communication based on the first communication method during a first time period, and allocate the antenna 52 to the communication based on the second communication method during the second time period different from the first time period. The first time period and the second time period may be variously determined according to an installation environment, an operation condition, or the like of the lighting device including the communication module 50.

The communication chip 51 may include a controller that processes data according to the first communication method and the second communication method and a communication circuit that converts the processed data from the controller into an analog signal and outputs the analog signal. The communication circuit may include an RF circuit. For example, when the first communication method and the second communication method use the same frequency band, the communication chip 51 may include one communication circuit. Further, if the first communication method and the second communication method use different frequency bands, the communication chip 51 may include a plurality of communication circuits. According to exemplary embodiments of the inventive concept, the controller may not be included in the communication chip 51 in the communication module 50, in which case the controller may be mounted outside the communication module 50 and in the lighting device.

Figure 3:
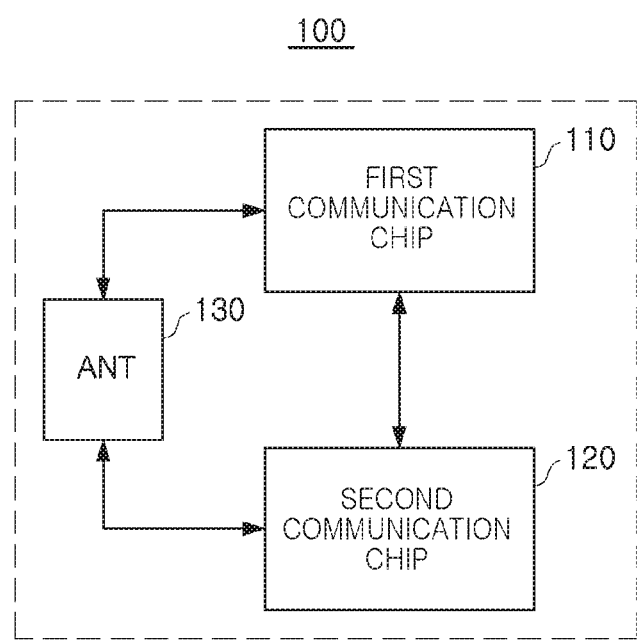
FIGS. 3, 4A, and 4B are block diagrams illustrating a communication module included in a lighting device according to an exemplary embodiment of the inventive concept.
Figure 4A:
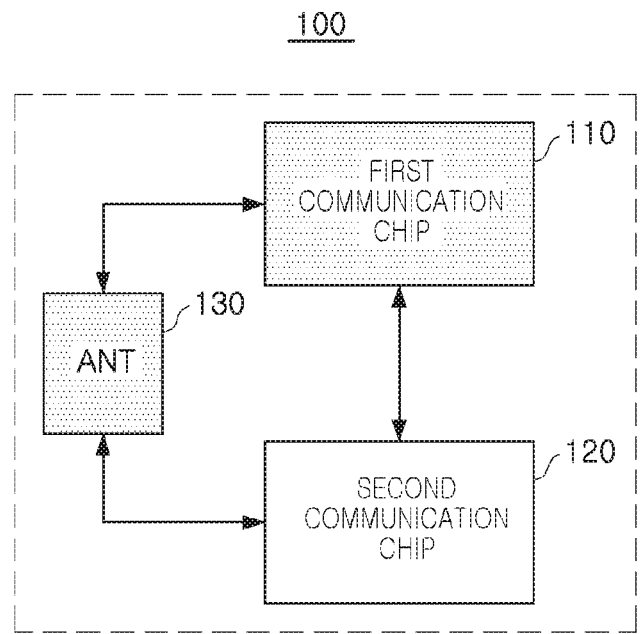
Figure 4B:
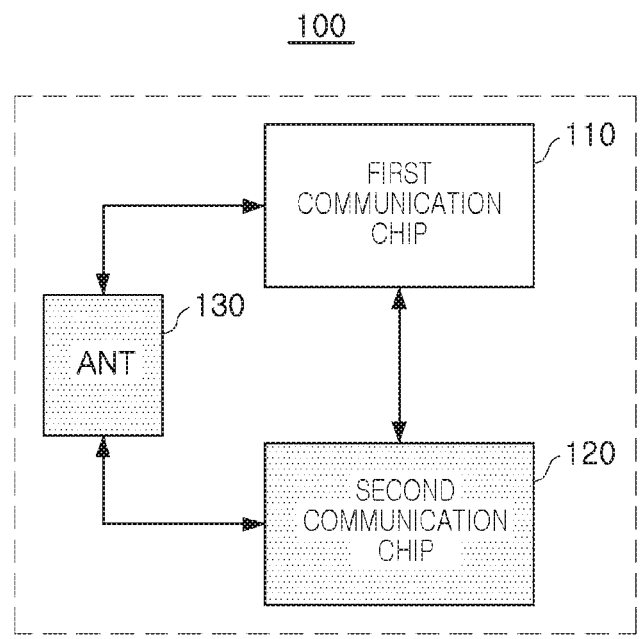

FIGS. 3, 4A, and 4B are block diagrams illustrating a communication module included in a lighting device according to an exemplary embodiment of the inventive concept.

First, referring to FIG. 3, a communication module 100 according to an exemplary embodiment of the inventive concept may include a first communication chip 110, a second communication chip 120, an antenna ANT 130, and the like. The first communication chip 110 and the second communication chip 120 may provide different communication methods. For example, the first communication chip 110 may provide Bluetooth or BLE, and the second communication chip 120 may provide Zigbee®, Z-Wave, or Wi-Fi.

The first communication chip 110 and the second communication chip 120 may share one antenna 130. Therefore, a scheme for controlling the first communication chip 110 and the second communication chip 120, such that a time for the first communication chip 110 to use the antenna 130 and a time for the second communication chip 120 to use the antenna 130 do not overlap each other, may be applied to the communication module 100. For example, the first communication chip 110 and the second communication chip 120 may be connected to communicate with each other and may share the antenna 130, while exchanging information regarding whether the antenna 130 is in use, a usage time of the antenna 130, or the like, with each other.

Referring to FIG. 4A, while the first communication chip 110 occupies the antenna 130, the second communication chip 120 may be deactivated. In other words, the second communication chip 120 may communicate with the first communication chip 110 to determine whether the first communication chip 110 occupies the antenna 130, and may be deactivated while the first communication chip 110 occupies the antenna, thus reducing power consumption of the communication module 100.

Referring to FIG. 4B, while the second communication chip 120 occupies the antenna 130, the first communication chip 110 may be deactivated. Similarly to the case described above with reference to FIG. 4A, the first communication chip 110 may be deactivated while the second communication chip 120 occupies the antenna 130 to reduce power consumption of the communication module 100.

Unlike the exemplary embodiments illustrated in FIGS. 4A and 4B, the first communication chip 110 and the second communication chip 120 may both share the antenna 130 in an activated state. Here, the first communication chip 110 and the second communication chip 120 may share the antenna 130 in a time division manner such that an operation of the first communication chip 110 using the antenna 130 and an operation of the second communication chip 120 using the antenna 130 do not conflict with each other.

For example, when the first communication chip 110 is a Bluetooth communication chip and the second communication chip 120 is a Zigbee® communication chip, the communication module 100 may be connected to an external gateway using the second communication chip 120 to communicate therewith. The communication module 100 may communicate with the gateway using the second communication chip 120 and substantially simultaneously operate the first communication chip 110 in a Bluetooth beacon mode. The communication module 100 may realize the Bluetooth beacon operation by allocating the antenna 130 to the first communication chip 110 every predetermined period or for a time period during which the second communication chip 120 does not occupy the antenna 130.

Figure 5:
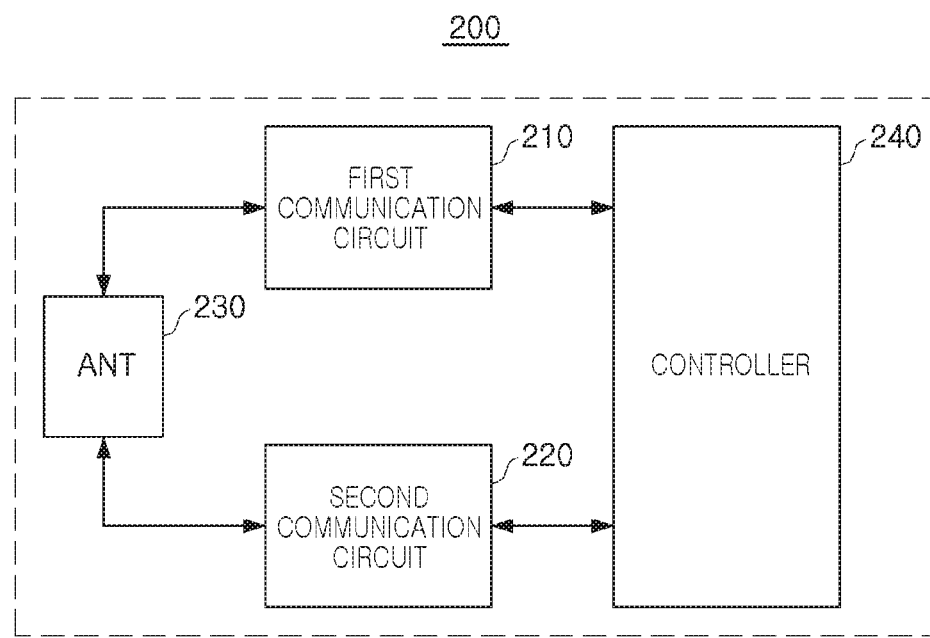
FIGS. 5, 6A, and 6B are block diagrams illustrating a communication module included in a lighting device according to an exemplary embodiment of the inventive concept.
Figure 6A:
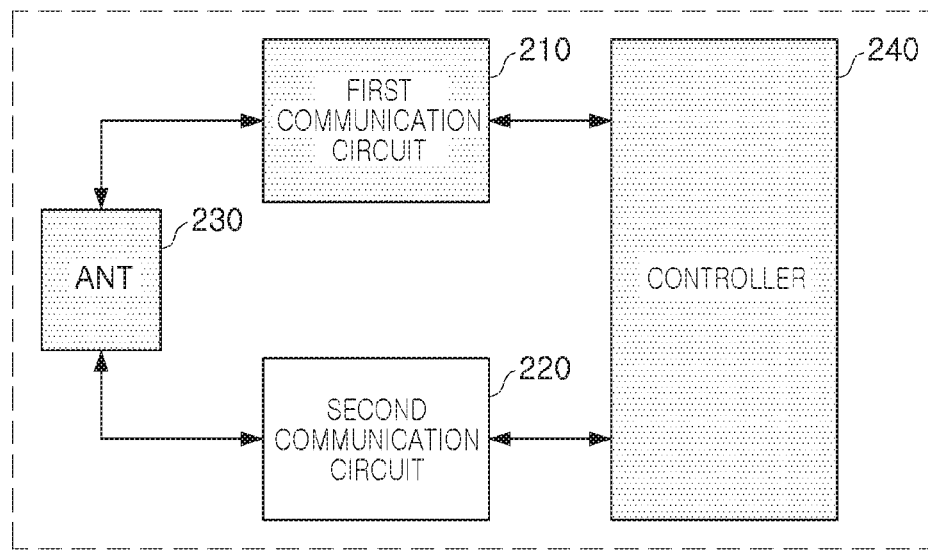
Figure 6B:
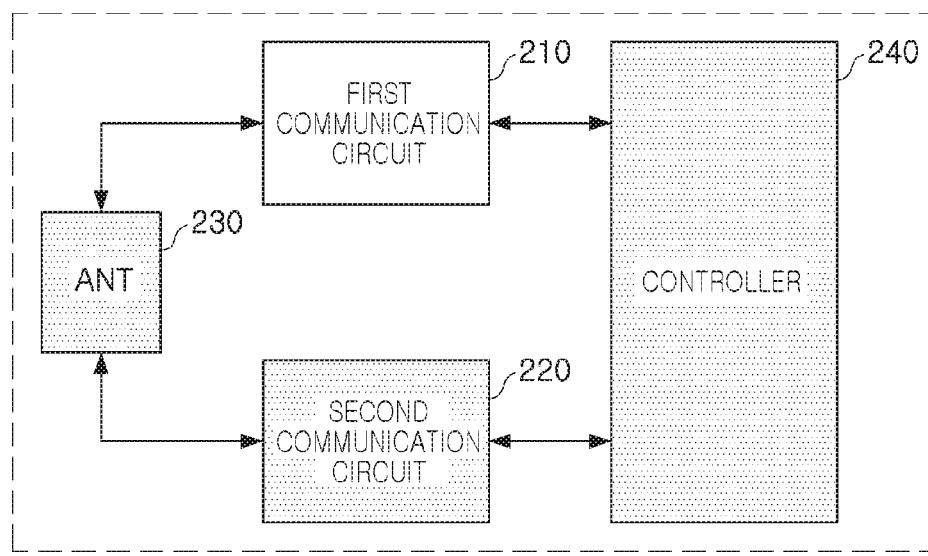

FIGS. 5, 6A, and 6B are block diagrams illustrating a communication module included in a lighting device according to an exemplary embodiment of the inventive concept.

Referring to FIG. 5, a communication module 200 according to an exemplary embodiment of the inventive concept includes a first communication circuit 210, a second communication circuit 220, an antenna ANT 230, a controller 240, and the like. The controller 240 may transmit and receive data to and from external devices using the first communication circuit 210 or the second communication circuit 220. In an example, the controller 240 may communicate with external devices by Bluetooth or BLE via the first communication circuit 210 and communicate with external devices by Zigbee® or Z-Wave via the second communication circuit 220. For example, the first communication circuit 210 and the second communication circuit 220 may process signals having the same frequency band or different frequency bands. The first communication circuit 210 and the second communication circuit 220 may include an RF circuit for transmitting and receiving a radio signal.

The first communication circuit 210 and the second communication circuit 220 may share one antenna 230. The controller 240 may control the first communication circuit 210 and the second communication circuit 220 such that a time during which the antenna 230 is occupied by the first communication circuit 210 and a time during which the antenna 230 is occupied by the second communication circuit 220 do not overlap. For example, the controller 240 may activate only one of the first communication circuit 210 and the second communication circuit 220, or may activate both the first communication circuit 210 and the second communication circuit 220 and connect the first communication circuit 210 and the second communication circuit 220 to the antenna 230 in a time-division manner.

Referring to FIG. 6A, the controller 240 may deactivate the second communication circuit 220, while transmitting and receiving data using the first communication circuit 210 and the antenna 230. Referring to FIG. 6B, the controller 240 may deactivate the first communication circuit 210, while transmitting and receiving data using the second communication circuit 220 and the antenna 230. In other words, in the mode of transmitting/receiving data according to the first communication method, the communication module 200 may operate as illustrated in FIG. 6A, and in the mode of transmitting/receiving data according to the second communication method, the communication module 200 may operate as illustrated in FIG. 6B.

Alternatively, the controller 240 may activate both the first communication circuit 210 and the second communication circuit 220, and connect the antenna 230 to the first communication circuit 210 and the second communication circuit 220 in a time-division manner. The communication module 200 may transmit and receive data according to the first communication method, while the first communication circuit 210 occupies the antenna 230, and may transmit and receive data according to the second communication method, while the second communication circuit 220 occupies the antenna 230.

Figure 7:
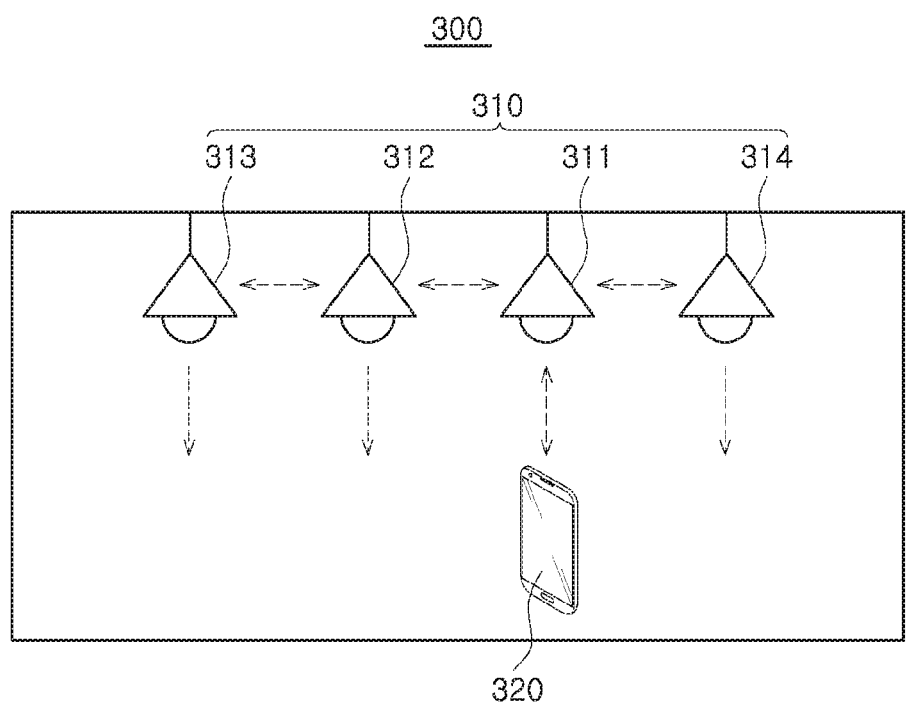
FIGS. 7 and 8 are views illustrating an operation of a lighting system according to an exemplary embodiment of the inventive concept.
Figure 8:
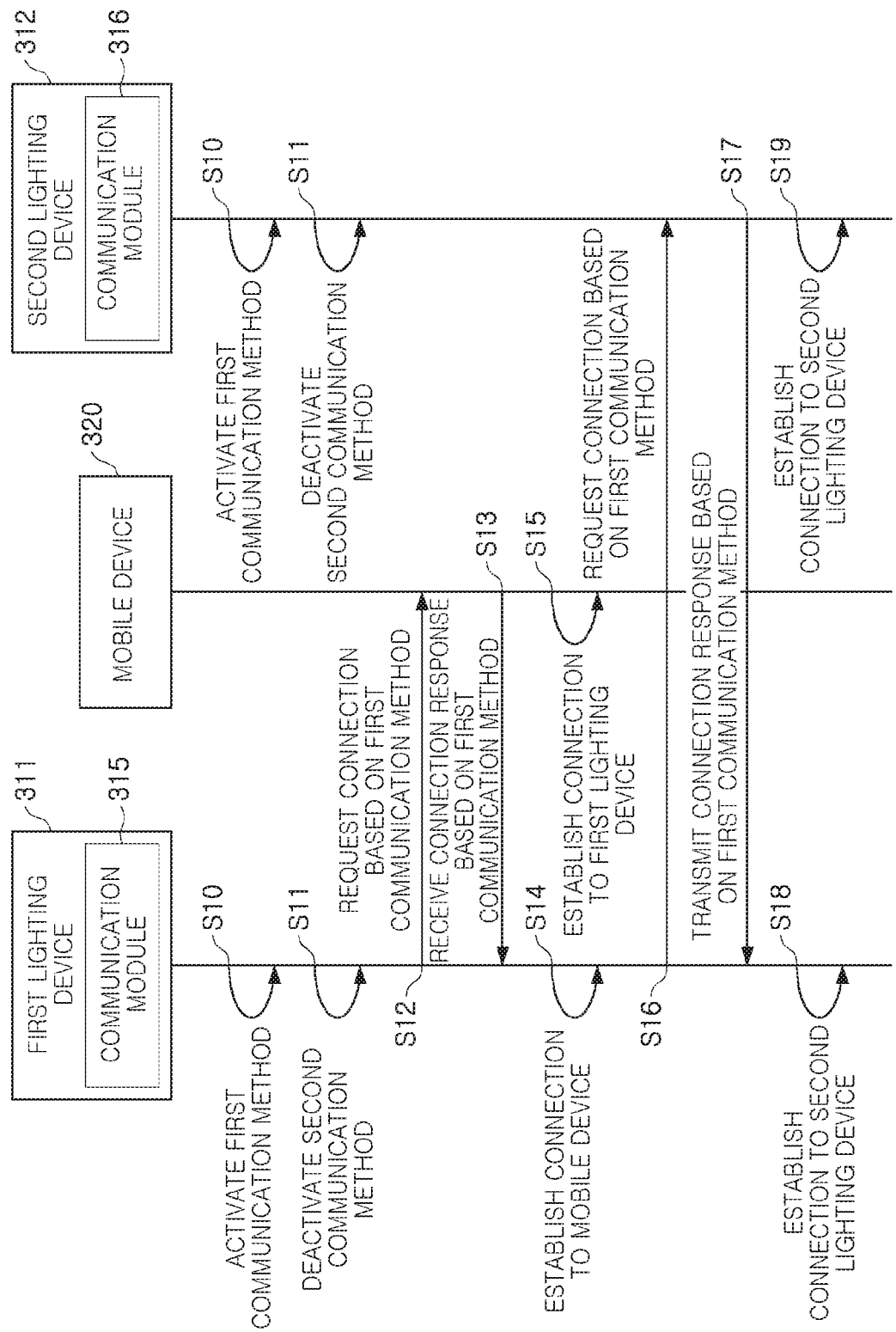

FIGS. 7 and 8 are views illustrating an operation of the lighting system according to an exemplary embodiment of the inventive concept.

Referring first to FIG. 7, a lighting system 300 may include a plurality of lighting devices 311 to 314 (310) and a mobile device 320. The plurality of lighting devices 310 may include a first lighting device 311, a second lighting device 312, a third lighting device 313, and a fourth lighting device 314, and each of the lighting devices 310 may include a communication module. The number of lighting devices 310 is not limited thereto and may be variously increased or decreased. The communication module may support the first communication method and the second communication method which are different from each other. The respective communication modules included in the lighting devices 310 may communicate with one another using one of the first communication method and the second communication method. In an exemplary embodiment of the inventive concept, the respective communication modules included the lighting devices 310 may communicate directly with one another according to the first communication method, without intervention of the mobile device 320 or any other external equipment.

The mobile device 320 may communicate directly with at least one of the lighting devices 310 using either the first communication method or the second communication method. In an exemplary embodiment of the inventive concept, the mobile device 320 may communicate directly with the first lighting device 311 using the first communication method. For example, the first communication method may be Bluetooth or BLE. The lighting devices 310 may communicate with one another directly in a BLE mesh manner. Hereinafter, an exemplary embodiment of the operation of the lighting system 300 illustrated in FIG. 7 will be described in more detail with reference to FIG. 8.

Referring to FIG. 8, a communication module 315 of the first lighting device 311 and a communication module 316 of the second lighting device 312 may activate the first communication method in operation S10 and deactivate the second communication method in operation S11. For example, the communication modules 315 and 316 may operate the first communication chip supporting the first communication method and enable the second communication chip to enter a sleep mode (or a standby mode). Alternatively, in the communication modules 315 and 316, the first communication circuit supporting the first communication method may be activated and the second communication circuit may be deactivated. Alternatively, one communication chip included in each of the communication modules 315 and 316 may activate the first communication method and deactivate the second communication method.

The communication module 315 of the first lighting device 311 may transmit a connection request based on the first communication method to the mobile device 320 in operation S12. If the first communication method is Bluetooth or BLE, the connection request in operation S12 may include a pairing request. The user may check the connection request received by the mobile device 320 and operate the mobile device 320 to respond to the connection request. When the user responds to the connection request, the communication module 315 of the first lighting device 311 may receive a connection response based on the first communication method in operation S13, and establishes a connection with the mobile device 320 in operation S14. The mobile device 320 may also establish a connection with the first lighting device 311 in operation S15.

The connection between the first lighting device 311 and the mobile device 320 may also be established as the mobile device 320 transmits the connection request based on the first communication method to the first lighting device 311, unlike the operations S12 to S15 described above. The first lighting device 311 may check a previously stored device list and establish a connection with the mobile device 320 if the mobile device 320 is present in the device list.

Meanwhile, the communication module 315 of the first lighting device 311 may send a connection request based on the first communication method to the communication module 316 of the second lighting device 312 in operation S16. In operation S17, the communication module 316 of the second lighting device 312 may transmit a connection response based on the first communication method to the communication module 315 of the first lighting device 311 in response to the request of operation S16. Thus, the communication module 315 of the first lighting device 311 may establish a connection with the second lighting device 312 in operation S18, and the communication module 316 of the second lighting device 312 may establish a connection with the first lighting device 311 in operation S19.

In the exemplary embodiment illustrated in FIGS. 7 and 8, the lighting devices 310 and the mobile device 320 may be connected to each other using one communication method. In an example, at least one of the lighting devices 310 and the mobile device 320 may communicate directly with each other through Bluetooth or BLE. In addition, the lighting devices 310 may communicate with one another using a BLE mesh network.

The user may control the lighting devices 310 using an executable application (e.g., a lighting control application) in the mobile device 320, or may check information of the lighting devices 310, e.g., a state of the lighting devices 310, power consumption of the lighting devices 310, whether an abnormality has occurred, or the like. A control command input by the user through the application may be transmitted to the first lighting device 311 directly connected to the mobile device 320, and the first lighting device 311 may identify a device intended to be controlled by the user, among the lighting devices 310, and transfer the control command. When transferring the control command to the other lighting devices 312 to 314, the first lighting device 311 may use the BLE mesh network described above.

Figure 9:
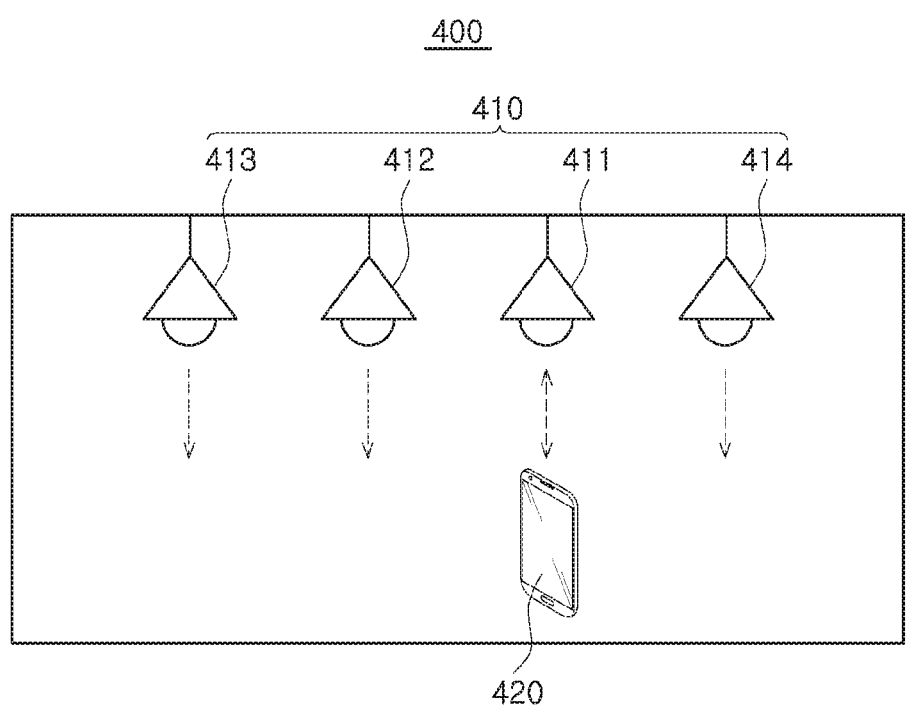
FIGS. 9 and 10 are views illustrating an operation of a lighting system according to an exemplary embodiment of the inventive concept.
Figure 10:
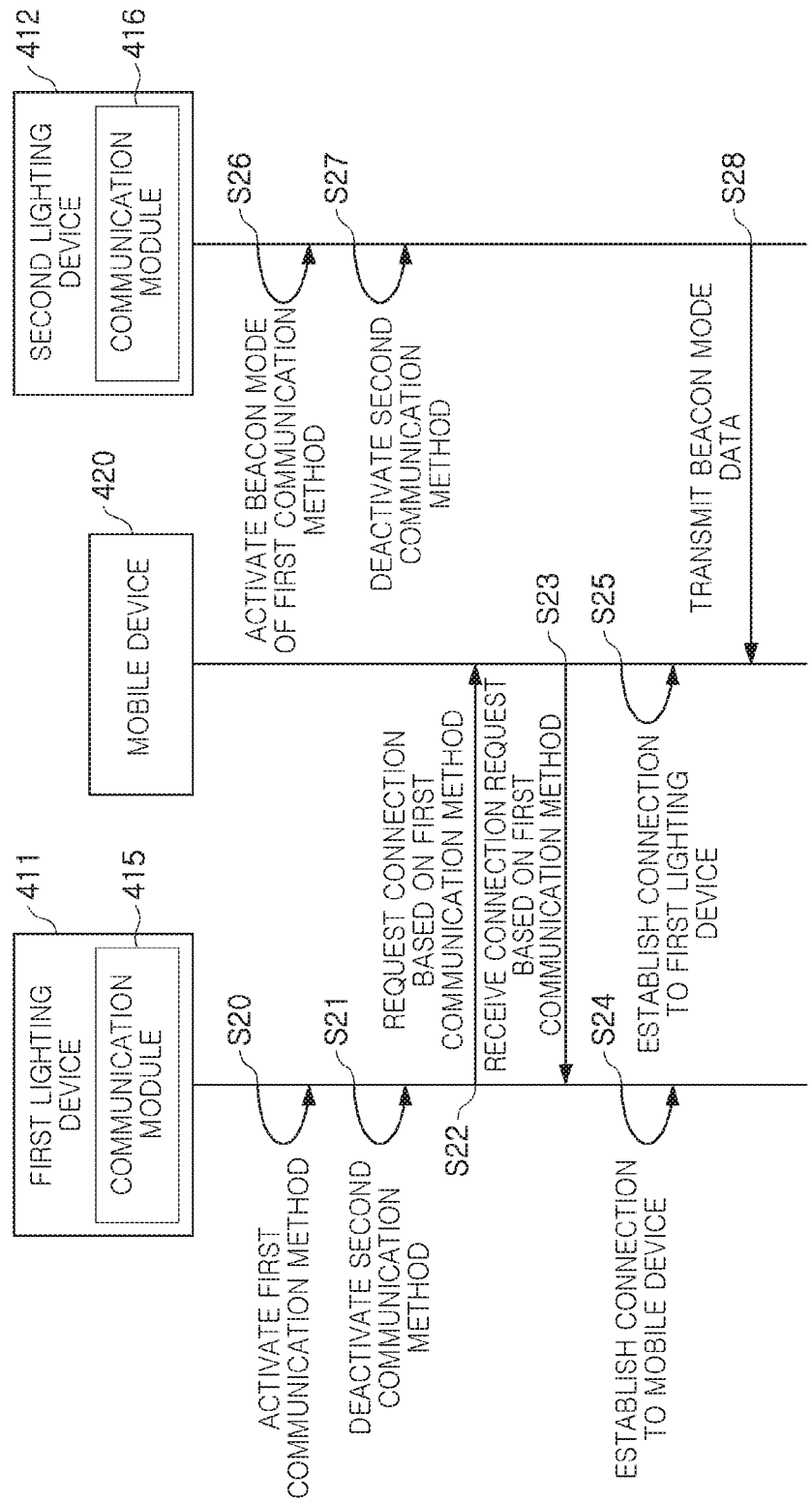

FIGS. 9 and 10 are views illustrating an operation of a lighting system according to an exemplary embodiment of the inventive concept.

Referring to FIG. 9, a lighting system 400 may include a plurality of lighting devices 411 to 414 (410) and a mobile device 420. The plurality of lighting devices 410 may include first to fourth lighting devices 411 to 414, and each of the lighting devices 410 may include a communication module. The number of the lighting devices 410 may be variously changed as needed. The respective communication modules included in the lighting devices 410 may support the first communication method and the second communication method which are different from each other.

The mobile device 420 may be a device such as a smartphone or a tablet PC and may communicate directly with at least one of the lighting devices 410 using either the first communication method or the second communication method. In an exemplary embodiment of the inventive concept, the mobile device 420 may communicate directly with the first lighting device 411 using the first communication method. In an example, the first communication method may be Bluetooth or BLE. Additionally, in the exemplary embodiment illustrated in FIG. 9, the respective communication modules of the second to fourth lighting devices 412 to 414 may operate in a BLE beacon mode. In an example, when a specific event occurs, the respective communication modules of the second to fourth lighting devices 412 to 414 may transmit data to the mobile device 420 using the BLE beacon mode. The specific event may include information necessary for maintenance/repair of the second to fourth lighting devices 412 to 414, failure information, or the like.

Hereinafter, an exemplary embodiment of an operation of the lighting system 400 illustrated in FIG. 9 will be described in more detail with reference to FIG. 10.

Referring to FIG. 10, a communication module 415 of the first lighting device 411 activates the first communication method in operation S20 and deactivates the second communication method in operation S21. For example, the communication module 415 of the first lighting device 411 may operate the first communication chip supporting the first communication method and enable the second communication chip to enter a sleep mode (or a standby mode). Alternatively, in the communication module 415, the first communication circuit supporting the first communication method may be activated and the second communication circuit may be deactivated. Alternatively, one communication chip included in each of the communication modules 415 and 416 may activate the first communication method and deactivate the second communication method.

The communication module 415 of the first lighting device 411 may transmit a connection request based on the first communication method to the mobile device 420 in operation S22. If the first communication method is Bluetooth or BLE, the connection request in operation S22 may include a pairing request. The user may check the connection request received by the mobile device 420 and operate the mobile device 420 to respond to the connection request. When the user responds to the connection request, the communication module 415 of the first lighting device 411 may receive a connection response based on the first communication method in operation S23, and establishes a connection with the mobile device 420 in operation S24. The mobile device 420 may also establish a connection with the first lighting device 411 in operation S25.

The connection between the first lighting device 411 and the mobile device 420 may also be established by first sending, by the mobile device 420, the connection request based on the first communication method to the first lighting device 411, unlike the operations S22 to S25 described above. The first lighting device 411 may check a previously stored device list and establish a connection with the mobile device 420 if the mobile device 420 is present in the device list.

Meanwhile, the communication module 416 of the second lighting device 412 may activate a beacon mode of the first communication method in operation S26 and deactivate the second communication method in operation S27. In operation S28, the communication module 416 of the second lighting device 412 may transmit data to the mobile device 420 in a beacon mode each time a predetermined event occurs or each time a predetermined period arrives. The user may control the first lighting device 411 using the mobile device 420 and recognize an operational state of the second lighting device 412, e.g., whether the second lighting device 412 has a fault, or the like, using the beacon mode.

Figure 11:
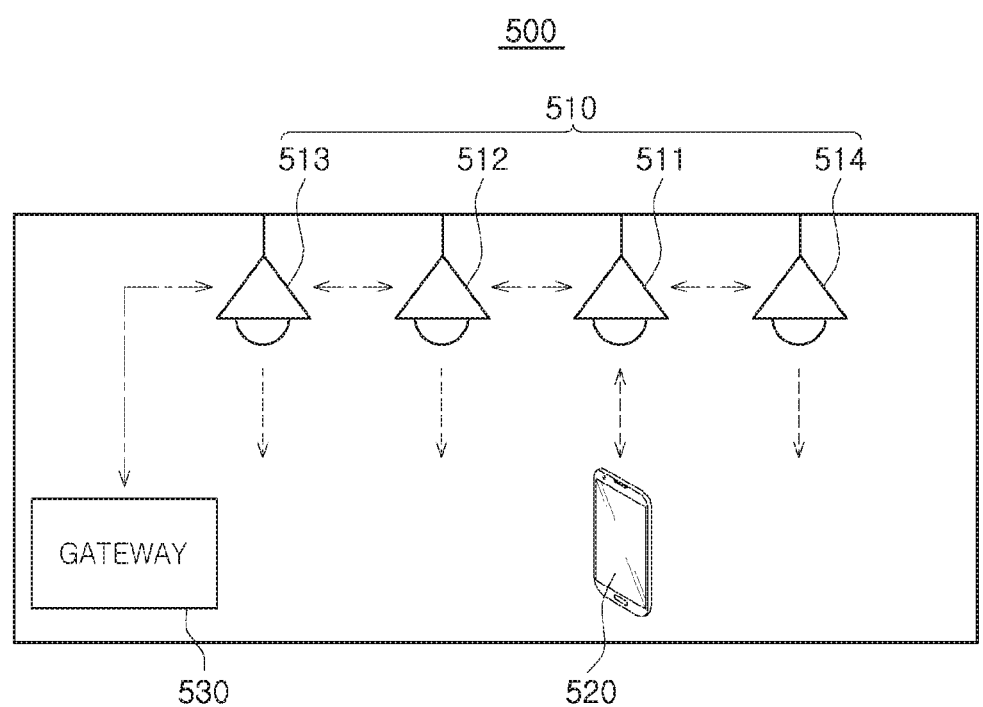
FIGS. 11 and 12 are views illustrating an operation of a lighting system according to an exemplary embodiment of the inventive concept.
Figure 12:
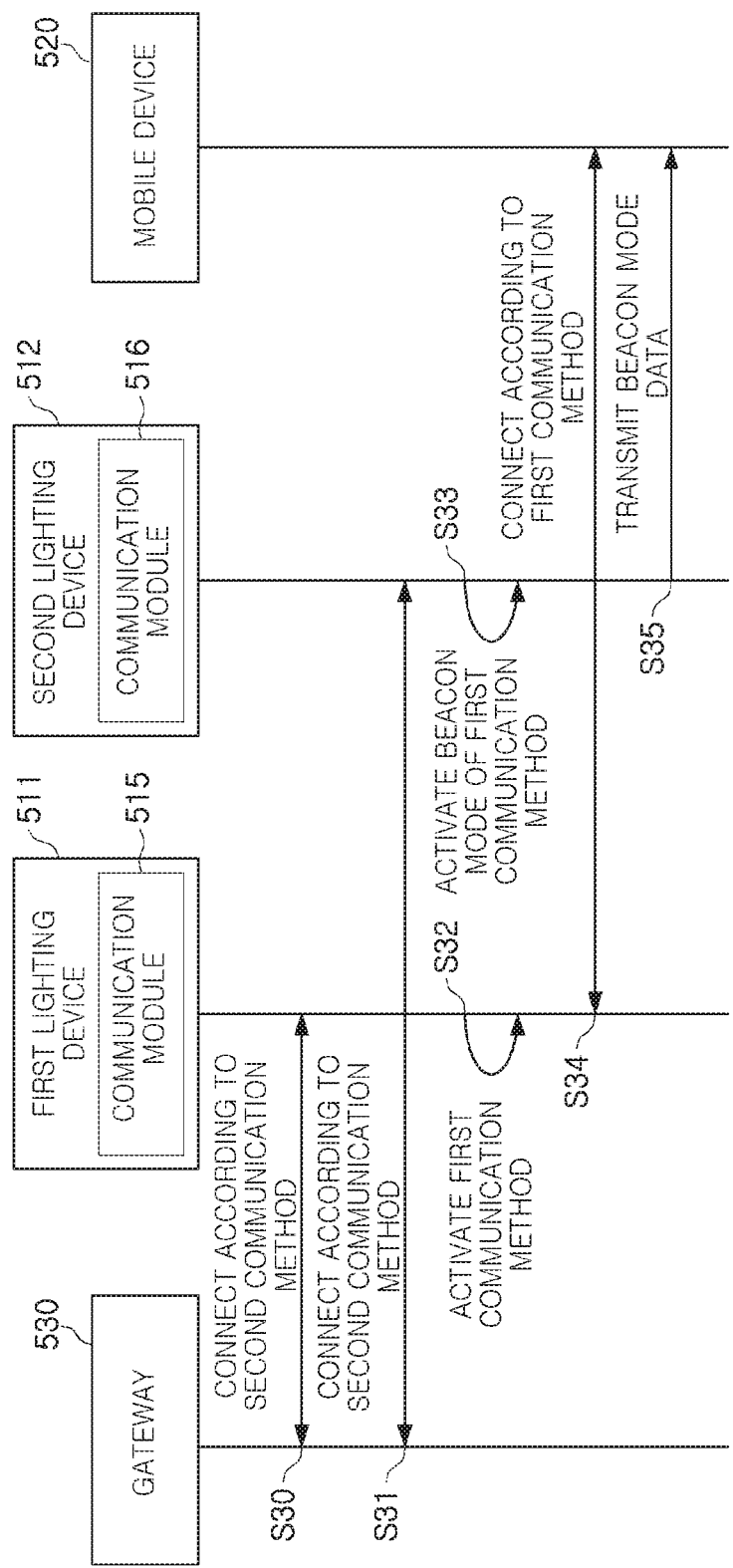

FIGS. 11 and 12 are views illustrating an operation of a lighting system according to an exemplary embodiment of the inventive concept.

Referring to FIG. 11, a lighting system 500 may include a plurality of lighting devices 511 to 514 (510) and a mobile device 520. The plurality of lighting devices 510 may include first to fourth lighting devices 511 to 514 and the like, and each of the lighting devices 510 may include a communication module. The number of the lighting devices 510 is not limited thereto and may be variously modified. The communication modules may support the first communication method and the second communication method which are different from each other. The respective communication modules included in the lighting devices 510 may communicate with one another using one of the first communication method and the second communication method.

In the exemplary embodiment illustrated in FIG. 11, the mobile device 520 may communicate directly with at least one of the lighting devices 510 using either the first communication method or the second communication method. In an exemplary embodiment of the inventive concept, the mobile device 520 may communicate directly with the first lighting device 511 using the first communication method. For example, the first communication method may be Bluetooth or BLE. The respective communication modules of the second to fourth lighting devices 512 to 514 excluding the first lighting device 511 may transmit data to the mobile device 520 by activating the BLE beacon mode.

The lighting devices 510 may be connected to communicate with one another through a gateway 530 according to the second communication method. For example, the second communication method may be Zigbee® or Z-Wave. Alternatively, at least one of the lighting devices 510 may be connected to the gateway 530 according to the second communication method, and the lighting devices 510 may be connected to one another according to the second communication method. In this case, the respective communication modules included in the lighting devices 510 may operate as Zigbee® routers. In the exemplary embodiment illustrated in FIG. 11, the respective communication modules included in the lighting devices 510 may activate both the first communication method and the second communication method.

Hereinafter, an exemplary embodiment of an operation of the lighting system 500 illustrated in FIG. 11 will be described in more detail with reference to FIG. 12.

Referring to FIG. 12, a communication module 515 of the first lighting device 511 and a communication module 516 of the second lighting device 512 may be connected to the gateway 530 according to the second communication method in operations S30 and S31. Alternatively, according to exemplary embodiments of the inventive concept, the communication module 515 of the first lighting device 511 may be connected to the gateway 530 and the communication module 516 of the second lighting device 512 may be connected to the first communication module 515 of the lighting device 511 according to the second communication method. Meanwhile, the communication module 515 of the first lighting device 511 may activate the first communication method in operation S32, and the communication module 516 of the second lighting device 512 may activate the first communication method to a beacon mode in operation S33.

The communication module 515 of the first lighting device 511 may be directly connected to the mobile device 520 according to the first communication method in operation S34. The method of establishing the connection between the communication module 515 of the first lighting device 511 and the mobile device 520 may be similar to that described above. For example, if one of the communication module 515 of the first lighting device 511 and the mobile device 520 sends a connection request first and the other responds thereto, a communication channel based on the first communication method may be formed between the communication module 515 of the first lighting device 511 and the mobile device 520.

The communication module 516 of the second lighting device 512 may transmit data to the mobile device 520 using the beacon mode of the second communication method in operation S35. In an exemplary embodiment of the inventive concept, the second lighting device 512 may transmit data to the mobile device 520 each time a predetermined event occurs or a predetermined period arrives. The data may include state information, power consumption, a usage time, or the like of the second lighting device 512.

In the exemplary embodiment described above with reference to FIGS. 11 and 12, the respective communication modules included in the lighting devices 510 may activate both the first communication method and the second communication method. When each communication module includes only one antenna, the antenna may be allocated to the first communication method and the second communication method in a time division manner or the like. For example, the communication module 515 of the first lighting device 511 may allocate the antenna only to the first communication method, while a direct connection based on the first communication method is established with the mobile device 520. If the direct connection with the mobile device 520 is cut off, the communication module 515 of the first lighting device 511 may form a communication channel with the gateway 530 by allocating the antenna to the second communication method.

Figure 13:
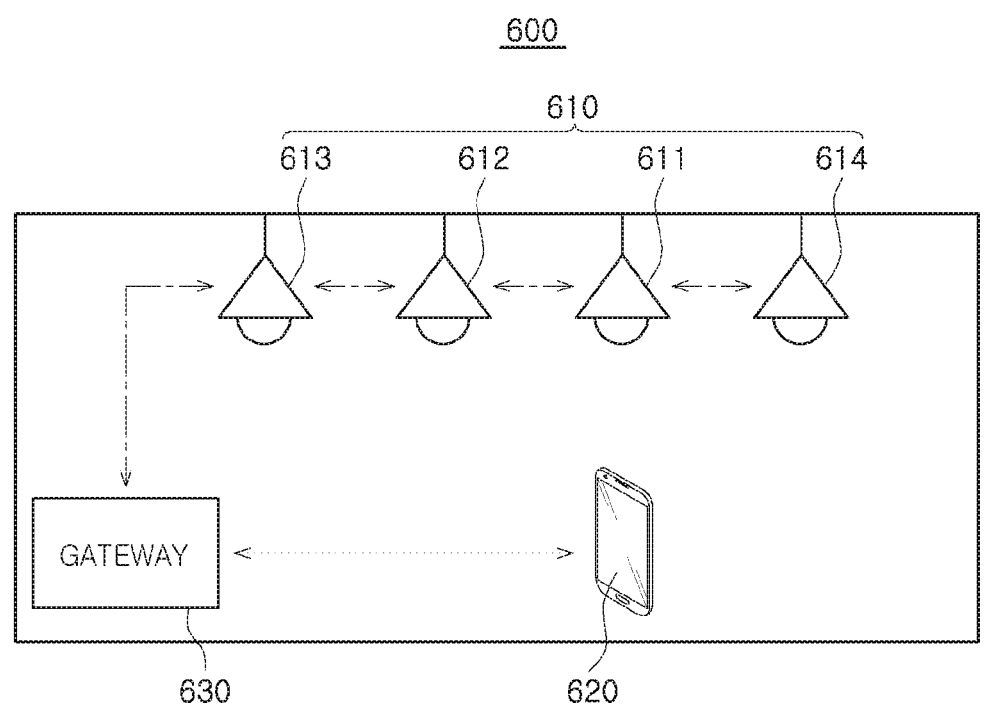
FIGS. 13 and 14 are views illustrating an operation of a lighting system according to an exemplary embodiment of the inventive concept.
Figure 14:
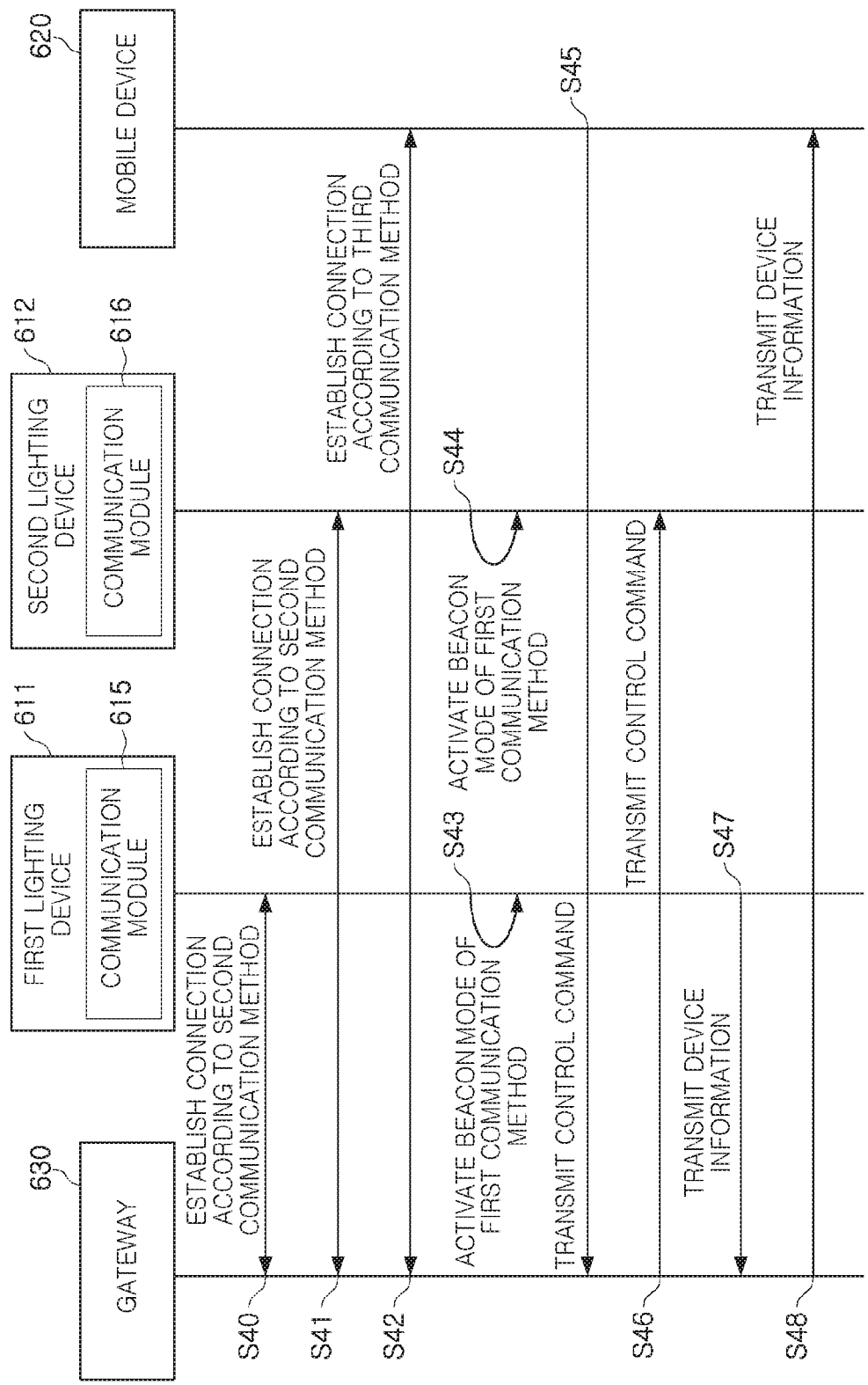

FIGS. 13 and 14 are views illustrating an operation of a lighting system according to an exemplary embodiment of the inventive concept.

Referring to FIG. 13, a lighting system 600 may include lighting devices 611 to 614 (610), a mobile device 620, and a gateway 630. Each of the lighting devices 610 may include a communication module that supports the first communication method and the second communication method which are different from each other and may communicate with the gateway 630 through the second communication method. For example, the first communication method may be Bluetooth, BLE, or the like, and the second communication method may be Zigbee®, Z-Wave, Wi-Fi, or the like. The gateway 630 may communicate with the lighting devices 610 according to the second communication method. The respective communication modules of the lighting devices 610 may operate as Zigbee® routers and may be connected to communicate with one another through Zigbee® communication.

Meanwhile, the gateway 630 may be connected to the mobile device 620 through a third communication method different from the first communication method and the second communication method. For example, when the first communication method is Bluetooth or BLE and the second communication method is Zigbee®, the third communication method may be Wi-Fi. The gateway 630 may be connected to the mobile device 620 through Wi-Fi communication via a separate access point.

A control command generated in the mobile device 620 may be transferred to at least one of the lighting devices 610 via the gateway 630. The gateway 630 may convert the control command received from the mobile device 620 according to the third communication method into a format suitable for the second communication method, and transmit the converted control command to at least one of the lighting devices 610. Hereinafter, an exemplary embodiment of an operation of the lighting system 600 illustrated in FIG. 13 will be described in more detail with reference to FIG. 14.

Referring to FIG. 14, a communication module 615 of the first lighting device 611 and a communication module 616 of the second lighting device 612 may be connected to the gateway 630 through the second communication method in operations S40 and S41. Alternatively, according to exemplary embodiments of the inventive concept, at least one of the lighting devices 610 may be connected to the gateway 630 according to the second communication method and the lighting devices 610 may be connected to one another according to the second communication method. In other words, the respective communication modules of the lighting devices 610 may provide a router function of the second communication method.

The gateway 630 may be connected to communicate with the mobile device 620 according to the third communication method in operation S42. The gateway 630 may be directly connected to the mobile device 620 via Wi-Fi communication, may be connected to communicate with the mobile device 620 via a mobile communication network to which the mobile device 620 is connected, or may be connected to the mobile device 620 through an access point or the like connected to the gateway 630. Meanwhile, the communication module 615 of the first lighting device 611 and the communication module 616 of the second lighting device 612 may activate the first communication mode to the beacon mode in operations S43 and S44.

The mobile device 620 may generate a control command and may transmit the control command to the gateway 630 according to the third communication method in operation S45. The gateway 630 may convert the control command received from the mobile device 620 into a format suitable for the second communication method, and transmit the converted control command to a target lighting device in operation S46. In the exemplary embodiment illustrated in FIG. 14, the target lighting device may be the second lighting device 612. The second lighting device 612 may receive the control command via the communication module 616 and adjust brightness, illumination time, or the like of a light source of the second lighting device 612 in response to the control command.

When a predetermined event occurs or when a predetermined period arrives, at least one of the lighting devices 610 may generate device information and transmit the device information to the gateway 630 in operation S47. The lighting devices 610 may transmit device information to the gateway 630 using the second communication method. The gateway 630 may convert the device information received in operation S47 into a format suitable for the third communication method, and transmits the converted device information to the mobile device 620 in operation S48. The user may recognize or view state information, power consumption, a usage time, or the like of the lighting devices 610 via the mobile device 620.

In other words, in the lighting system 600 according to the exemplary embodiment described with reference to FIGS. 13 and 14, the mobile device 620 may transmit the control command to the lighting devices 610 through the gateway 630 and collect information from the lighting devices 610 via the gateway 630. A communication method of connecting the gateway 630 and the lighting devices 610 and a communication method of connecting the gateway 630 and the mobile device 620 may be different from each other.

Figure 15:
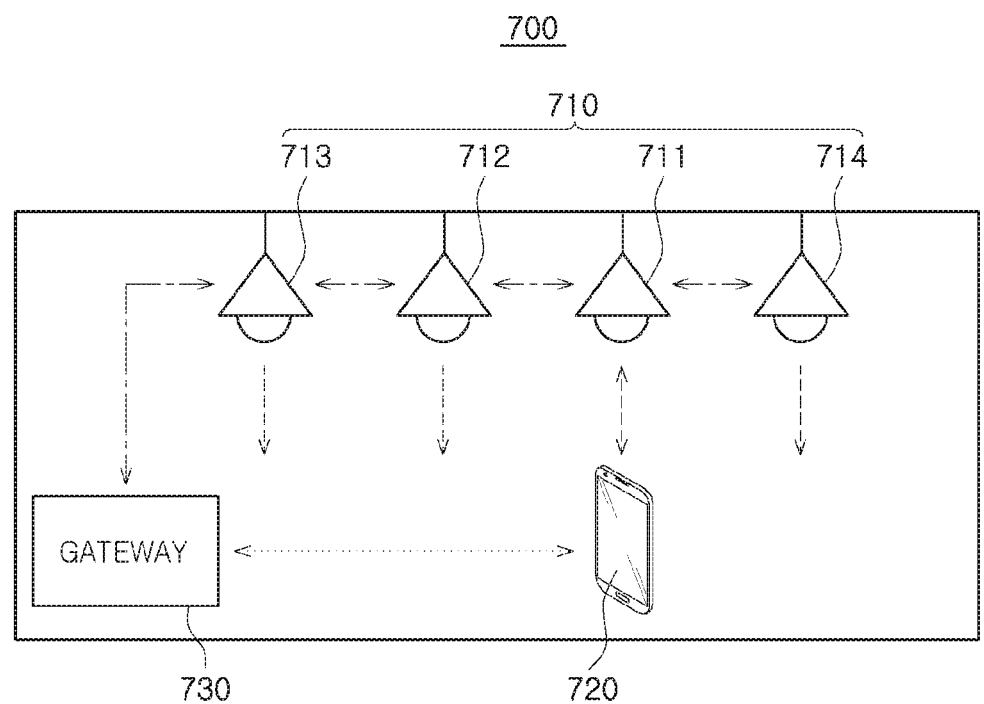
FIGS. 15 and 16 are views illustrating an operation of a lighting system according to an exemplary embodiment of the inventive concept.
Figure 16:
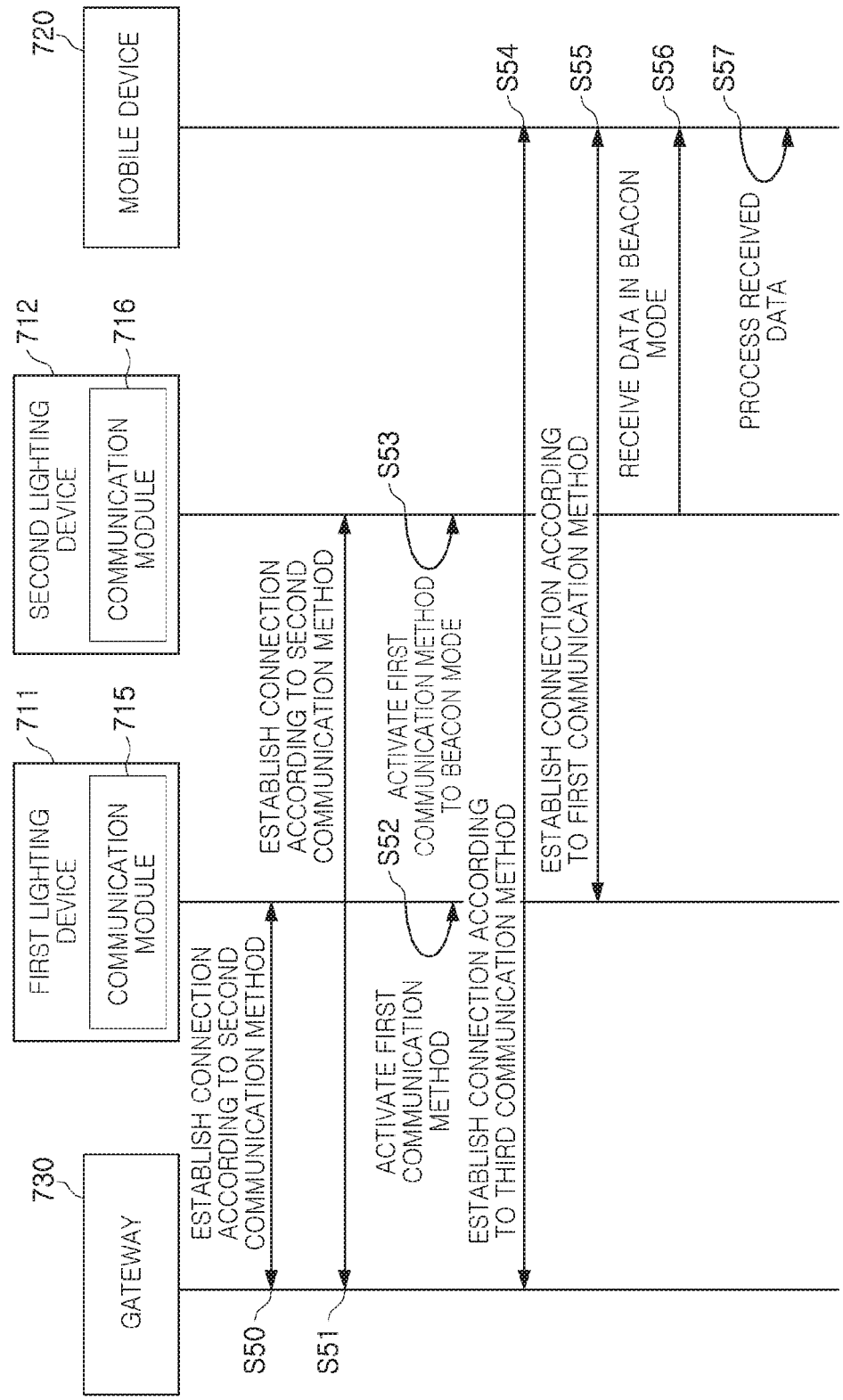

FIGS. 15 and 16 are views illustrating an operation of a lighting system according to an exemplary embodiment of the inventive concept.

Referring to FIG. 15, a lighting system 700 may include lighting devices 711 to 714 (710), a mobile device 720, and a gateway 730. The lighting devices 710 may include a communication module that supports the first and second communication methods which are different from each other, and may communicate with the gateway 730 through the second communication method. For example, the first communication method may be Bluetooth, BLE, or the like, and the second communication method may be Zigbee®, Z-Wave, Wi-Fi, or the like. The gateway 730 may communicate with the lighting devices 710 according to the second communication method. In an example, the respective communication modules of the lighting devices 710 may operate as Zigbee® routers and may be connected to communicate with one another through Zigbee® communication.

At least one of the lighting devices 710 may be connected to be able to communicate directly with the mobile device 720 according to the first communication method. In the exemplary embodiment illustrated in FIG. 15, the first lighting device 711 may be directly connected to the mobile device 720 according to the first communication method. Meanwhile, the second to fourth lighting devices 712 to 714 operate in the beacon mode of the first communication method and may transmit data to the mobile device 720.

In the exemplary embodiment illustrated in FIG. 15, the respective communication modules of the lighting devices 710 may activate both the first communication method and the second communication method. Therefore, when each communication module includes only one antenna, the communication module may prevent conflict by allocating the antenna to the first communication method and the second communication method in a time division manner or the like.

Meanwhile, the gateway 730 may be connected to the mobile device 720 through the third communication method different from the first communication method and the second communication method. For example, when the first communication method is Bluetooth or BLE and the second communication method is Zigbee®, the third communication method may be Wi-Fi. For example, the gateway 730 may be connected to the mobile device 720 through Wi-Fi communication via a separate access point.

In the exemplary embodiment illustrated in FIG. 15, since both the first communication method and the second communication method are activated in each of the communication modules of the lighting devices 710, the lighting devices 710 may directly receive a control command from the mobile device 720 through the first communication method or may receive the control command according to the second communication method through the gateway 730. For example, the first lighting device 711, which is directly connected to the mobile device 720 according to the first communication method, may receive a control command from the mobile device 720. The first lighting device 711 may convert the control command received according to the first communication method into a format suitable for the second communication method and transmit the converted control command to the other lighting devices 712 to 714. Alternatively, the gateway 730 may receive the control command from the mobile device 720 according to the third communication method, convert the control command into a format suitable for the second communication method, and transmit the converted control command to the lighting devices 710.

Hereinafter, an exemplary embodiment of an operation of the lighting system 700 illustrated in FIG. 15 will be described in more detail with reference to FIG. 16.

Referring to FIG. 16, a communication module 715 of the first lighting device 711 and a communication module 716 of the second lighting device 712 may be connected to the gateway 730 according to the second communication method in operations S50 and S51. Alternatively, according to exemplary embodiments of the inventive concept, at least one of the lighting devices 710 may be connected to the gateway 730 according to the second communication method and the lighting devices 710 may be connected to one another according to the second communication method. In other words, the respective communication modules of the lighting devices 710 may provide a router function of the second communication method.

The communication module 715 of the first lighting device 711 may activate the first communication method in operation S52, and the communication module 716 of the second lighting device 712 may activate the first communication mode to the beacon mode in operation S53. In other words, in the exemplary embodiment illustrated in FIGS. 15 and 16, the communication modules 715 and 716 may activate both the first communication method and the second communication method.

The gateway 730 may be connected to communicate with the mobile device 720 according to the third communication method in operation S54. The gateway 730 may be directly connected to the mobile device 720 through Wi-Fi communication, may be connected to be able to communicate with the mobile device 720 via a mobile communication network to which the mobile device 720 is connected, or may be connected to the mobile device 720 through an access point or the like connected to the gateway 730. The third communication method may be different from the second communication method.

In operation S55, the mobile device 720 may be connected to the communication module 715 of the first lighting device 711 in which the first communication method is activated, according to the first communication method. If the first communication method is Bluetooth or BLE, operation S55 may include a process of pairing the mobile device 720 and the first lighting device 711.

The mobile device 720 may transmit a control command directly to the first lighting device 711 according to the first communication method. The first lighting device 711 may transfer the control command received from the mobile device 720 to the other lighting devices 712 to 714 according to the second communication method. Alternatively, the mobile device 720 may transfer the control command to the gateway 730 according to the third communication method and the gateway 730 may transfer the control command to the lighting devices 710 according to the second communication method.

Meanwhile, the mobile device 720 may receive data from the communication module 716 of the second lighting device 712 operating in the beacon mode of the first communication method in operation S56 and process the received data in operation S57. For example, when data is received from at least one of the first lighting device 711 and the gateway 730 (e.g., second data) and from the second lighting device 712 (e.g., first data) at substantially the same time, an application of the mobile device 720 may process the received data. For example, the application of the mobile device 720 may process data received from the first lighting device 711 or the gateway 730 preferentially over the data received from the second lighting device 712.

Figure 17:
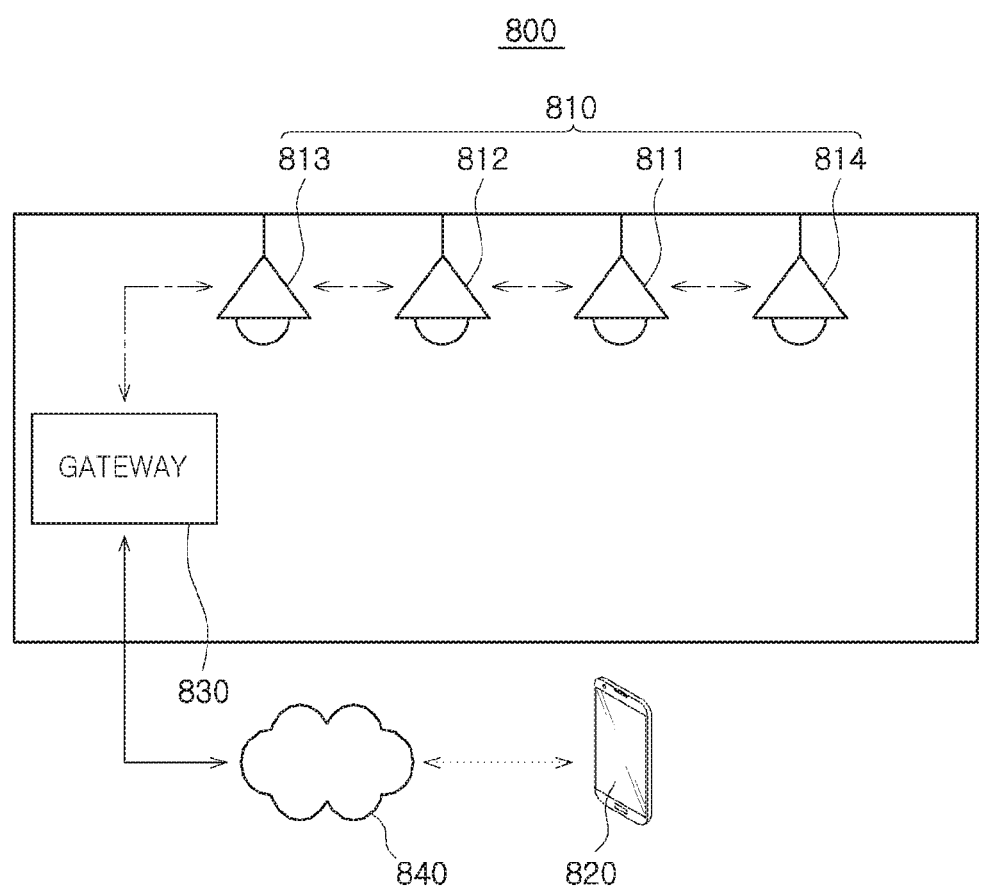
FIGS. 17 and 18 are views illustrating an operation of a lighting system according to an exemplary embodiment of the inventive concept.
Figure 18:
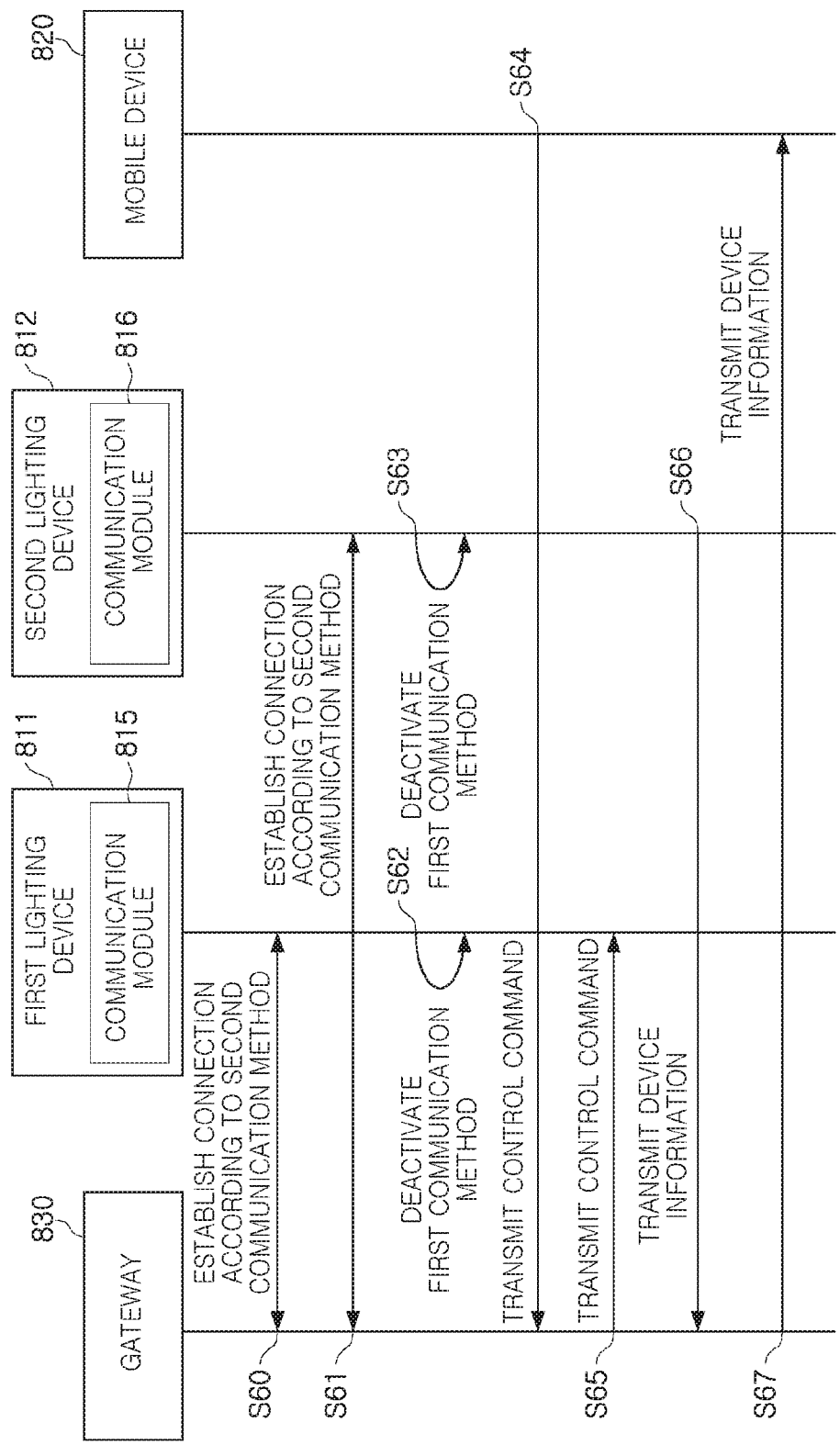

FIGS. 17 and 18 are views illustrating an operation of a lighting system according to an exemplary embodiment of the inventive concept.

Referring to FIG. 17, a lighting system 800 may include lighting devices 811 to 814 (810), a mobile device 820, and a gateway 830. The lighting devices 810 may each include a communication module that supports the first communication method and the second communication method which are different from each other, and may communicate with the gateway 830 according to the second communication method. For example, the first communication method may be Bluetooth, BLE, or the like, and the second communication method may be Zigbee®, Z-Wave, Wi-Fi, or the like. The gateway 830 may communicate with the lighting devices 810 according to the second communication method. For example, the respective communication modules of the lighting devices 810 may operate as Zigbee® routers and may be connected to communicate with one another through Zigbee® communication.

The gateway 830 may be connected to an external communication network 840. For example, the gateway 830 may be connected to the external communication network 840 through wired communication such as a LAN. The external communication network 840 may be a network for providing communication from the outside of a space where the lighting devices 810 and the gateway 830 are installed, and may be a network to which the mobile device 820 may be connected. For example, the external communication network 840 may be a 3G mobile communication network, a 4G mobile communication network, a 5G mobile communication network, or the like. In other words, the mobile device 820 may be connected to the gateway 830 via the external communication network 840.

A control command generated by the mobile device 820 may be transferred to the lighting devices 810 via the external communication network 840 and the gateway 830. Thus, the user may control the lighting devices 810 using the mobile device 820 even from the outside. State information, power consumption, a usage time, or the like of the lighting devices 810 may also be transferred to the mobile device 820 via the gateway 830 and the external communication network 840. The user may recognize or view states of the lighting devices 810 using the mobile device 820 even from the outside.

Hereinafter, an exemplary embodiment of an operation of the lighting system 800 illustrated in FIG. 17 will be described in more detail with reference to FIG. 18.

Referring to FIG. 18, a communication module 815 of the first lighting device 811 and a communication module 816 of the second lighting device 812 may be connected to the gateway 830 according to the second communication method in operations S60 and S61. Alternatively, according to exemplary embodiments of the inventive concept, at least one of the lighting devices 810 may be connected to the gateway 830 according to the second communication method and the lighting devices 810 may be connected to one another according to the second communication method. In other words, the respective communication modules of the lighting devices 810 may provide a router function of the second communication method.

The communication module 815 of the first lighting device 811 and the communication module 816 of the second lighting device 812 may deactivate the first communication method in operations S62 and S63. In the exemplary embodiment illustrated in FIGS. 17 and 18, the mobile device 820 does not exist (e.g., may not be located) in the space where the lighting devices 810 are installed, and thus, the first communication method may be deactivated to minimize power consumption.

If the user wants to control the lighting devices 810 using the mobile device 820 from the outside, the mobile device 820 may generate a control command and transmit the generated control command to the gateway 830 in operation S64. In an exemplary embodiment of the inventive concept, the control command generated by the mobile device 820 may be transferred to the lighting devices 810 via the external communication network 840 and the gateway 830 in operation S65.

At least one of the lighting devices 810 may generate device information and transmit the generated device information to the mobile device 820. In the exemplary embodiment illustrated in FIG. 18, the second lighting device 812 may generate the device information. The second lighting device 812 may send the device information to the gateway 830 in operation S66 and the gateway 830 may transmit the device information received from the second lighting device 812 to the mobile device 820 in operation S67.

The operations described above with reference to FIGS. 17 and 18 are not limited to the case where the mobile device 820 is located outside the space where the lighting devices 810 and the gateway 830 are installed. The mobile device 820 may be connected to the external communication network 840 even when located in the space where the lighting devices 810 and the gateway 830 are installed. Thus, even when the mobile device 820 is located within the space in which the lighting devices 810 and the gateway 830 are installed, the control command generated by the mobile device 820 may be transmitted to the lighting devices 810 through the external communication network 840 and the gateway 830.

As set forth above, according to exemplary embodiments of the inventive concept, the respective communication modules included in the lighting devices may support the first communication method and the second communication method which are different from each other. The lighting system using at least one of the first communication method and the second communication method may be realized in consideration of whether a hub is present, a communication method provided by the mobile device, or the like. Therefore, a lighting device which may be flexibly adapted to various users' use conditions may be provided, and the lighting device may be applied to various use environments.

While the inventive concept has been shown and described with reference to exemplary embodiments thereof, it will be apparent to those of ordinary skill in the art that various modifications in form and details could be made thereto without departing from the spirit and scope of the inventive concept as set forth by the appended claims.

What is claimed is:

1. A lighting system comprising:
a plurality of lighting devices installed in a predetermined space and connected to one another to communicate with one another using at least one of a first communication method and a second communication method; and
a mobile device directly connected to at least one of the plurality of lighting devices to communicate therewith according to the first communication method,
wherein the first communication method and the second communication method are different,
each of the plurality of lighting devices includes a communication module having a first communication chip supporting the first communication method, a second communication chip supporting the second communication method, a shared antenna connected to and shared by the first and second communication chips, and a driver configured to drive a light source in response to a control command received by the communication module, and
at a first time while the first communication chip occupies the shared antenna, the communication module selectively activates the first communication chip and deactivates the second communication chip, and at a second time while the second communication chip occupies the shared antenna, the communication module selectively activates the second communication chip and deactivates the first communication chip.

2. The lighting system of claim 1, wherein:
the communication module of the at least one of the plurality of lighting devices deactivates the second communication method when directly connected to the mobile device according to the first communication method.

3. The lighting system of claim 1, wherein:
the at least one of the plurality of lighting devices transfers the control command, directly received from the mobile device according to the first communication method, to the other remaining lighting devices among the plurality of lighting devices according to the first communication method.

4. The lighting system of claim 1, wherein:
the first communication method is Bluetooth or Bluetooth Low Energy (BLE) communication and the second communication method is Zigbee® or Z-Wave communication.

5. The lighting system of claim 1, further comprising:
a gateway connected to at least one of the plurality of lighting devices to communicate with the plurality of lighting devices according to the second communication method.

6. The lighting system of claim 5, wherein:
the mobile device is connected to the gateway to communicate with the gateway according to a third communication method that is different from the second communication method.

7. The lighting system of claim 6, wherein:
the mobile device transmits the control command regarding the at least one of the plurality of lighting devices to the gateway according to the third communication method, and
the gateway transmits the control command to the at least one of the plurality of lighting devices according to the second communication method.

8. The lighting system of claim 5, wherein:
the communication module of the at least one of the plurality of lighting devices deactivates the first communication method when connected to the gateway according to the second communication method.

9. The lighting system of claim 8, wherein:
the communication module of the at least one of the plurality of lighting devices activates the first communication method when disconnected from the gateway according to the second communication method.

10. The lighting system of claim 9, wherein:
the communication module of the at least one of the plurality of lighting devices establishes a connection to the mobile device by activating the first communication method.

11. The lighting system of claim 5, wherein:
the mobile device is directly connected to the at least one of the plurality of lighting devices according to the first communication method in the predetermined space, and is connected to the at least one of the plurality of lighting devices through the gateway outside the predetermined space.

12. The lighting system of claim 5, wherein:
the communication module of the at least one of the plurality of lighting devices outputs data in a beacon mode of the first communication method when connected to the gateway according to the second communication method.

13. The lighting system of claim 5, wherein:
the mobile device includes a lighting control application configured to generate the control command, and
the lighting control application processes first data directly received from the at least one of the plurality of lighting devices according to the first communication method and second data received from the gateway according to the second communication method.

14. A lighting device comprising:
a communication module having a first communication chip supporting a first communication method, a second communication chip supporting a second communication method, and a shared antenna connected to and shared by the first and second communication chips;
a light source having a plurality of light emitting diodes (LEDs); and
a driver configured to drive the light source in response to a control command received by the communication module,
wherein the first communication method and the second communication method are different,
the first and second communication chips share the shared antenna in an activated state in a time division manner,
the communication module processes a first RF signal based on the first communication method when the shared antenna is allocated to the first communication chip and not allocated to the second communication chip, and processes a second RF signal based on the second communication method when the shared antenna is allocated to the second communication chip and not allocated to the first communication chip, and
at a first time while the first communication chip occupies the shared antenna, the communication module selectively activates the first communication chip and deactivates the second communication chip, and at a second time while the second communication chip occupies the shared antenna, the communication module selectively activates the second communication chip and deactivates the first communication chip.

15. The lighting device of claim 14, wherein:
the communication module directly communicates with an external mobile device according to the first communication method and communicates with at least one of the external gateway and an external communication module according to the second communication method.

16. The lighting device of claim 15, wherein:
the communication module sets the first communication method to a beacon mode, while communicating with at least one of the external gateway and the external communication module according to the second communication method.

17. The lighting device of claim 14, wherein:
the communication module includes one radio frequency (RF) circuit configured to process the first RF signal based on the first communication method and the second RF signal based on the second communication method.

18. The lighting device of claim 17, wherein:
the first communication method and the second communication method use the same frequency band.

19. A lighting system comprising:
a plurality of lighting devices installed in a predetermined space and connected to one another to communicate directly with one another using a first communication method without communicating through a gateway;
the gateway connected to at least one of the plurality of lighting devices to communicate with the plurality of lighting devices according to a second communication method; and
a mobile device directly connected to at least one of the plurality of lighting devices to communicate therewith according to the first communication method,
wherein the first communication method and the second communication method are different,
each of the plurality of lighting devices includes a communication module configured to support the first communication method and the second communication method, and a driver configured to drive a light source in response to a control command received by the communication module, and
when one of the plurality of lighting devices is directly connected to at least another one of the plurality of lighting devices using the first communication method, the one of the plurality of lighting device is disconnected from the gateway.

* * * * *